United States Patent [19]

Bruel

[11] 4,085,572
[45] * Apr. 25, 1978

[54] SELF-ADJUSTING BEATING DEVICE FOR A GRAPE HARVESTING MACHINE

[76] Inventor: Alain Bruel, Domaine Le Petit Chaumont, Eigues Mortes, Gare, France

[*] Notice: The portion of the term of this patent subsequent to Jun. 24, 1992, has been disclaimed.

[21] Appl. No.: 637,040

[22] Filed: Dec. 2, 1975

[30] Foreign Application Priority Data

Dec. 2, 1974 France .................... 74 40716

[51] Int. Cl.² ............................................ A01D 46/00
[52] U.S. Cl. ...................................................... 56/330
[58] Field of Search ............................ 56/328, 330, 29

[56] References Cited

U.S. PATENT DOCUMENTS

| 3,703,072 | 11/1972 | Patzlaff | 56/330 |
| 3,890,775 | 6/1975 | Bruel | 56/330 |

*Primary Examiner*—Russell R. Kinsey
*Attorney, Agent, or Firm*—Remy J. VanOphem

[57] ABSTRACT

A beating device for a grape harvesting machine for the harvesting of grapes from a row of grapevines. The beating device comprises a pair of beaters mounted on the harvesting machine in opposing relationship to define thereinbetween a longitudinal space for the passage of a row of grapevines. Each of the beaters comprises a plurality of vertically spaced, horizontally disposed whips, the ends of which are mounted to a lever which, in turn, is pivotally carried by a first eccentric so as to impose a transverse beating action to the whips. A first shaft, rotatable about a vertical axis, carries the eccentric while the eccentric carries an arm member attached to an adjustable resilient return means which functions to automatically return the whip toward the longitudinal space with the resilient force increasing in response to the resistance of the whip when the same engages a grapevine offset from the normal plane of the row of grapes. The other end of the lever is attached by means of a connecting rod to a second eccentric mounted to and rotatable with a second vertical shaft. Motor means are provided for driving the second shaft.

9 Claims, 18 Drawing Figures

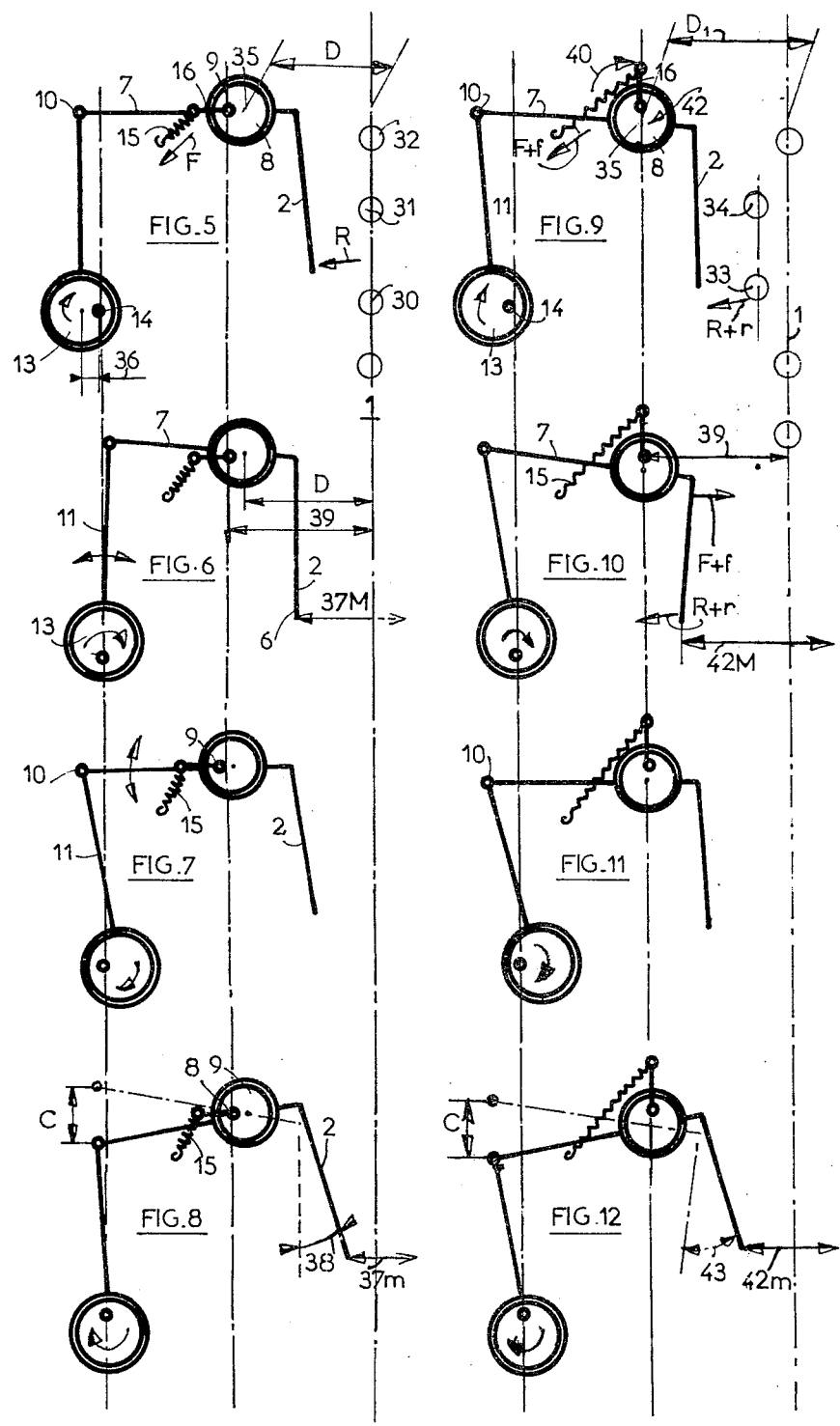

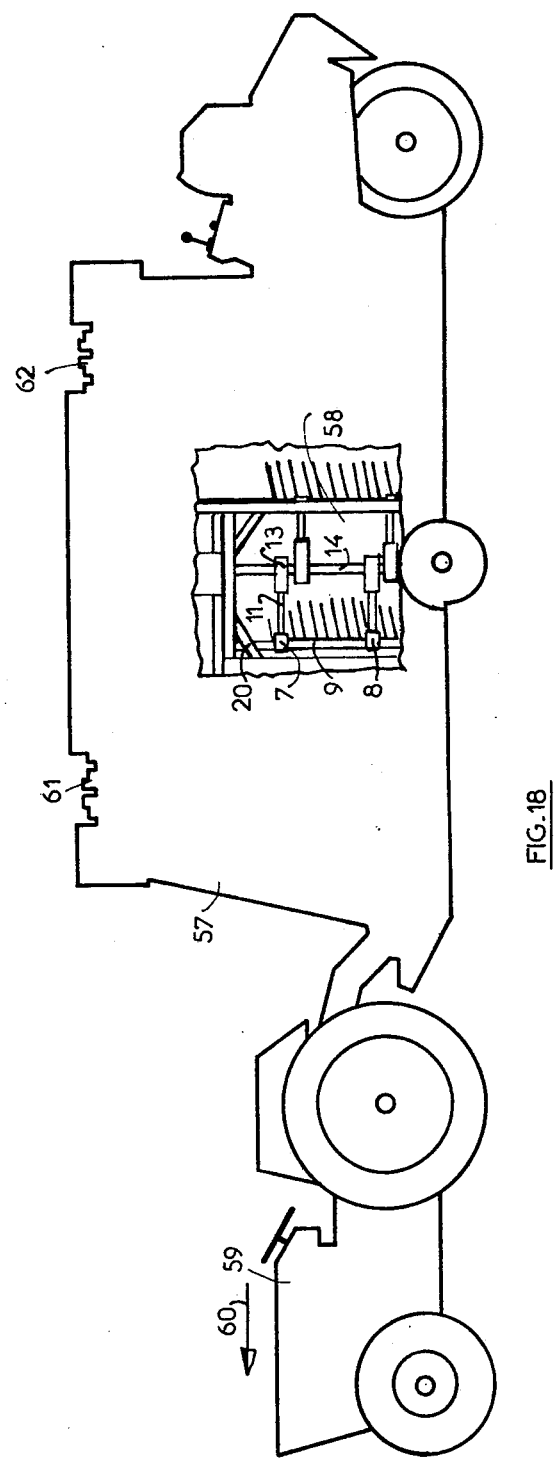

SELF-ADJUSTING BEATING DEVICE FOR A GRAPE HARVESTING MACHINE

BACKGROUND OF THE INVENTION

I. Field of the Invention

The present invention relates to a tranverse beating mechanism for a grape harvesting machine. It also concerns the beater kinematics.

II. Description of the Prior Art

The grape harvesting machines of known type are provided with two series of beaters disposed on either side of the row of vines concerned. These beaters are imparted a transverse motion to transmit to the grapes a speed sufficient for tearing the clusters of grapes away from the vine. The main problem is, firstly to adjust the initial position of the beaters, then to determine the proper transverse oscillation frequency permitting to collect the maximum of intact grapes without submitting the vine to injuries, i.e., without plucking off the leaves and without breaking the shoots.

When the beaters are horizontal whips, the known mechanisms keep substantially constant the spacing between two opposite points during the whole motion of the beater members. It is obvious that such devices have the major drawback to comply only with one of the two preceding conditions, namely:

if the spacing between two opposite beater points is reduced, most of the grapes will be collected, but the vine will be injured;

if the spacing between two opposite beater points is increased, the percentage of grapes collected will be insufficient; it would be then necessary to increase the beaters oscillation frequency, which would again result in injuring the vines.

Known improvements have been developed by the present applicant, namely:

asymmetrical motions can be imparted to opposite beaters;

the spacing between two opposite beaters points can be varied during the machine operation, by means of an adequate mechanism.

However, all the grape harvesting machines of known type are provided with a bearing mechanism which necessitates a preliminary adjustment. This preadjustment is satisfactory only under the following conditions:

(a) All the vines of one row must be exactly in line. Otherwise, i.e., if some vines are shifted out of the row, or if some vine shoots extend more on one side of the row, then more on the other side, the percentage of harvested grapes is decreasing, while the leaves plucking off is increasing.

(b) The vine characteristics (foliage density, etc . . . ) must be constant all along the row. Otherwise, operation defects are appearing, specially at places where a vine plant is missing.

Quite obviously, both those conditions are never perfectly complied with on the whole vine field area, so that the grape harvesting is not entirely satisfactory.

It has been found quite remarkable that, when using a beating mechanism according to French Pat. No. 2,213,003, now U.S. Pat. No. 3,939,629, the beater driving eccentric located close to the vine row (and connected to the beating whips) is subject to a relatively small effort; most of the efforts are supported by the connecting rod within which the second eccentric is rotating. These main efforts result from the reactions to the accelerations which are imparted to the grape clusters by the beating whips, since the vines are not struck, but continuously moved and oscillated.

SUMMARY OF THE INVENTION

The present invention aims to realize a self-adjusting beating mechanism, i.e., a beating mechanism permitting to automatically adjust the whips position and the oscillation amplitude according to the local characteristics of each row of vines. Moreover, a device according to the invention can be easily mounted onto any grape-harvesting machine of known type.

A beating device according to the invention, specially for a grape-harvesting machine, comprises at least two beaters oppositely disposed on either side of a row of vines, each beater including a series of vertically superposed horizontal rods or whips, one of the ends of each rod being intergral with a whip-carrying plate vertically fixed to an oscillating assembly in order to transversely accelerate the vines for detaching the grape clusters therefrom, and it is characterized in that each beater is fixed to the inner end of at least one transversal level adapted to pivot about the center of a first eccentric vertical shaft, the latter being rotatably mounted in bearings carried by the machine frame, the rotation of said first eccentric vertical shaft in said bearings being submitted to the action of adjustable resilient return means resiliently connecting a fixed point of the machine frame with a member integral with said first eccentric, so that adjustable resilient return means tend to automatically return opposite whip points towards the row of vines, the return resilient force increasing automatically together with the vines reaction, which results in a rotation of said first eccentric about its vertical axis until both opposite forces, resulting one from the vines reaction and the other one from said return resilient force, automatically equalize themselves, thus self-adjusting at any moment the position of the two opposite beaters assembly, while said transversal lever has an outer end hinged to the foot end of a longitudinal connecting rod, the head end of which is rotatably provided with a second eccentric driven by means of a second rotating vertical shaft, eccentrically mounted on the machine frame and rotated by means of an adequate mechanism.

BRIEF DESCRIPTION OF THE DRAWINGS

The accompanying drawing, which is given by way of a non-limiting example, will allow understanding of the features and advantages of the invention.

FIG. 5 illustrates an initial transversal movement of a beater when the vine plants are correctly in line.

FIG. 6 illustrates an intermediate transversal movement of the beater when the plants are in line.

FIG. 7 illustrates another intermediate movement of the beater when the plants are in line.

FIG. 8 illustrates yet another intermediate movement.

FIGS. 9 to 12 respectively correspond to FIGS. 5 to 8, illustraing the automatic adjustment of both the position- and amplitude- or oscillation of a beater, according to the vine reaction.

FIG. 10 is an intermediate position of the beater.

FIG. 11 is a further intermediate position of the beater.

FIG. 12 is yet a further intermediate position of the beater.

FIG. 18 is another example of a grape-harvesting machine.

FIG. 1 shows a transversely beating device comprising two pair of beaters. Said beating device is adapted to be mounted on a grape-harvesting machine, which could be of one of the known types illustrated on FIGS. 15, 16 and 18 by way of example.

DESCRIPTION OF THE PREFERRED EMBODIMENTS

Figure 1:
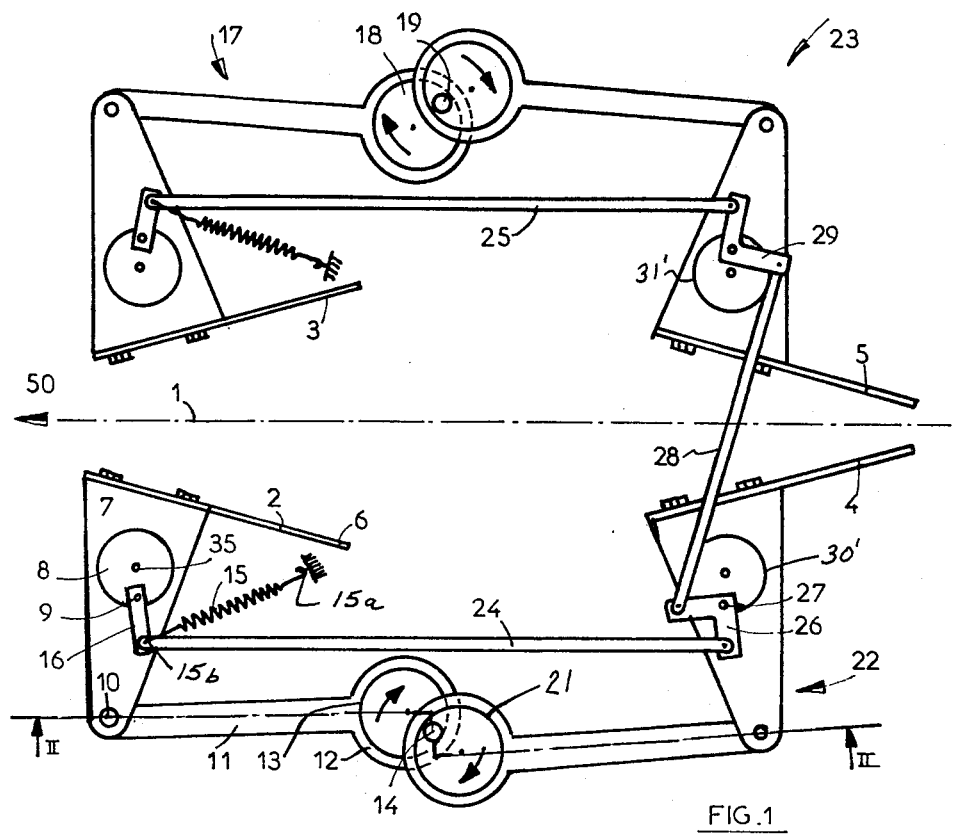
FIG. 1 is a plan view of a self-adjusting beating mechanism according to the invention.

Said grape-harvesting machine may have structure defining only one tunnel for collecting the grapes of one row of vines stocks 1. Beaters 2 and 3 are disposed opposite each other on either side of said vine row. A second pair of beaters 4 and 5 is mounted in a similar manner.

Each of these four beaters is made of horizontal flexible whips, vertically superposed along the whole height of the vines, each whip is fixed by one of its ends to a beating mechanism transmitting to them a transverse movement. The free ends or points 6 of the whips thus shuttle the vines. The speed received by the grape clusters from one beater generates a tearing force when the motion is stopped by the opposite beater.

Each whip of a beater 2 is fixed to a transverse lever 7 within which is rotatably mounted an eccentric 8 having a vertical axis. The rear end of lever 7 is hinged to the end 10 of a longitudinal horizontal connecting rod 11. A second eccentric 13 is provided in the head end 12 of connecting rod 11. Second eccentric 13 is integral with a vertical shaft 14 which is adapted to be rotated.

The vertical shaft 9 is pivoted in bearings 20 carried by the frame of the machine. It is integral with the first eccentric 8 and connected to resilient return means 15. Said resilient return means can be a return spring 15 having one end 15a fixed to the frame of the machine, and the other end 15b fixed to an arm 16 integral with the vertical shaft 9. A similar system is symmetrically mounted in opposition on the other side of the row of vines. This system 17 is moving beater 3 by means of an eccentric 18 rotating on a vertical shaft 19 which is similar to shaft 14.

Figure 2:
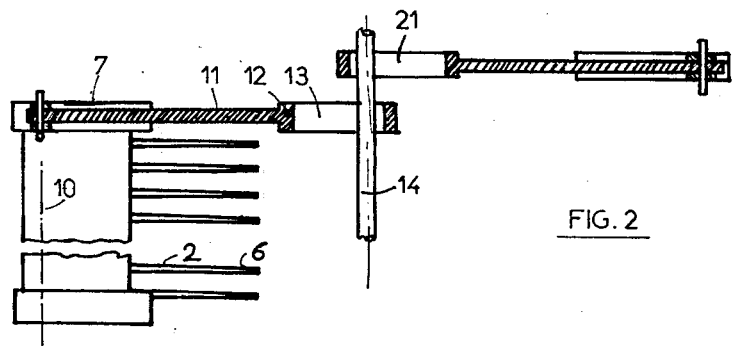
FIG. 2 is a side view according to II—II of FIG. 1 showing the longitudinal connecting rods, with part sections in the articulation zones.
Figure 3:
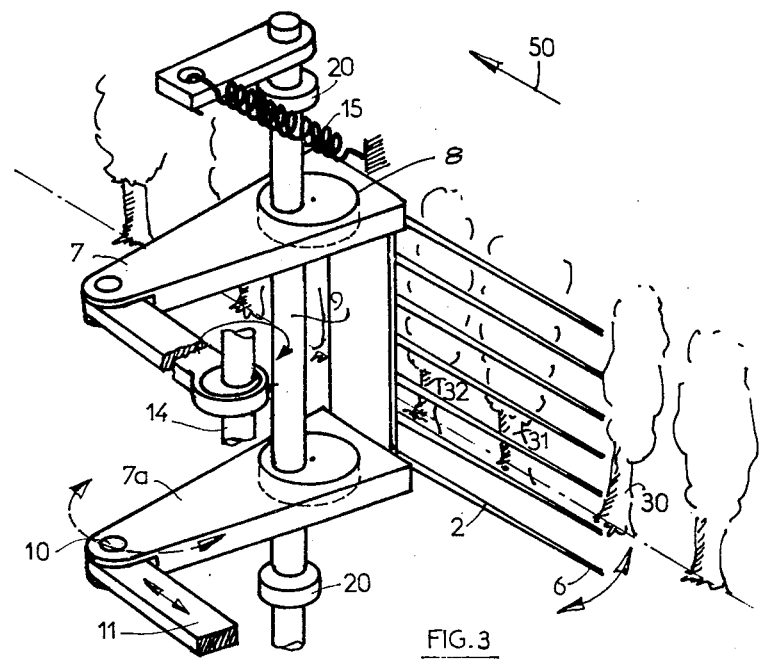
FIG. 3 is a perspective view showing the transversal levers.

Each beater 4 or 5 of the second pair also includes a transverse lever 26 (or 29) oscillating about a first eccentric which is integral with a vertical shaft. Said transverse level has a rear end hinged to the end of a longitudinal connecting rod 24 (or 25) in the end of which is rotating a second eccentric. In the structure illustrated on FIG. 1, the transverse motion of beaters 2 and 4 located on the same side of the vine row is generated by the rotation of the same vertical shaft 14. Both beaters 2 and 4 have synchronous movements. The phase shift between both movements is determined by the angular relative position of eccentrics 13 and 21 on shaft 14 (FIGS. 1 and 2). In the drawings, it has been supposed that beaters 2 and 4 are in phase opposition (180° phase shift), but any other timing could be determined. For example, both movements could be in phase coincidence.

Longitudinal bars 24 and 25 are connecting the front and rear beaters respectectively on each side of the vine row. The front end of connecting bar 24 is hinged to the arm 16 integral with shaft 9. The rear end of connecting bar 24 is hinged to a L-shaped arm 26 integral with the vertical shaft 27 of the eccentric mechanism 22. In a similar manner, the connecting bar 25 disposed on the other side of the vine row, is connecting the oscillation mechanisms of beaters 3 and 5, by means of eccentric vertical shafts. Finally, a transverse connecting bar 28 is connecting the free ends of both L-shaped arms 26 and 29 of the second couple of beaters 4 and 5. L-shaped arms 26 and 29 are fixed to eccentrics 30' and 31' with their longitudinal portions orientated in opposition. This disposition of elements 26, 28 and 28 determines for the two eccentrics such as 8 on one side of the vine row, an angular position which is at any moment symmetrical of the angular position of the corresponding two other eccentrics on the other side of vine row, with respect to the symmetry vertical plane 1.

When stocks 30, 31, 32, etc. . . . of the vine row 1 are in line, the operation of the mechanism is as follows:

The end of connecting rod 11 is moved longitudinally by means of second eccentric 13 and rotating shaft 14 (FIGS. 5, 6, 7 and 8).

Connecting rod 11 and transverse lever 7 form an oscillating mechanism which is moving about two fixed axis, namely the geometrical axis of shaft 14 and the central axis 35 of the concerned first eccentric 8. First eccentric 8 only supports relatively low forces, so that the resilient means 15 generates a return force F sufficient for compensating the vine reaction R at any moment of the beating operation. The center 35 of first eccentric 8 remains in a stationary position which is determined by the force F. Said force F tends to bring back beater 2 close to the vine row 1, and it is used to damp or filter the subsidiary oscillations having a frequency higher than the beating frequency. The longitudinal stroke C of hinge point 10 (equal to the double of the eccentration value 36 of second eccentric 13) is pivoting the transverse lever 7 about the center 35 of the first eccentric Whips is illustrated on FIG. 6. The minimal opening corresponds to the beater position illustrated on FIG. 8. The oscillation transverse amplitude is equal to an angle 38, the value of which is predetermined according to the dimensioning of the beating mechanism and according to the angular orientation of eccentrics 8. Each eccentric 8 is normally kept in a stationary position by means of the calibrated resilient return means 15 acting on shaft 9. Coordination between the movements of the four beaters 2, 3, 4 and 5 is obtained by means of longitudinal connecting bars 24 and 25, and by means of transverse connecting bar 28 (FIG. 1).

FIGS. 9 to 12 respectively correspond to FIGS. 5 to 8, but showing how the heater mechanism is self-adjusting when a beater such as 2, receives from the vine, a reaction (R and r). The additional force is for example resulting from the fact that some vine stocks 33 and 34 are shifted laterally out of the row. At any moment, the reaction (R and r) is compensated by a return force (F and f), wherein the additional force f is due to the elongation of return spring 15. Arm 16 is pivoted in the direction of arrow 40, thus driving shaft 9 and first eccentric 8. The center 35 of eccentric 8 is moved away from the vine row 1 up to a distance $D_1$ more than initial distance D. Comparing FIGS. 5 and 9, 6 and 10, 7 and 11, 8 and 12, it appears that:

when the pivot axis 35 of lever 7 moves away from vine row 1 ($D_1 > D$), the points 6 of a beater 2 also move away from the vine stocks;

the maximal opening $42_M$ (FIG. 10 is more than the maximal opening $37_M$ obtained in normal operating conditions (FIG. 6);

the minimal opening $42_m$ (FIG. 12) is more than the minimal opening $37_m$ in normal operating conditions (FIG. 8);

with the same length of the longitudinal stroke C of articulation point 10, the transverse oscillation amplitude of beater 2 is illustrated by an angle 43 (FIG. 12) which is more than the normal amplitude 38.

Figure 4:
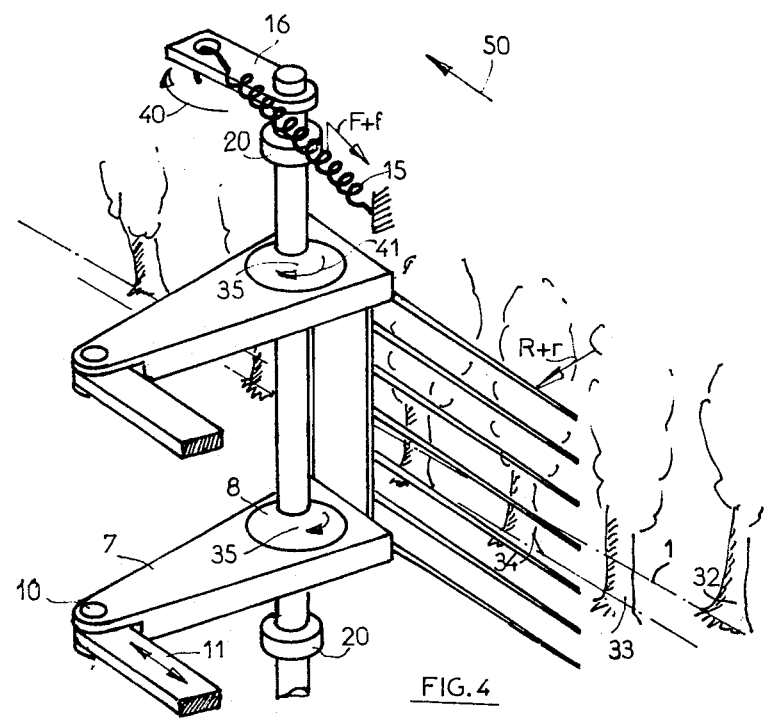
FIG. 4 corresponds to FIG. 3 and illustrates the rotation of the beater oscillation axis when a vine plant is shifted aside of the row.

FIG. 4 illustrates the orientation of eccentrics 8. Under action of the reaction (R and r) when the machine is moving forwardly (arrow 50), the resilient return system 15 is elongated, thus generating a return opposite force (F and f). As previously described, shaft 9 is rotated in bearings 20 together with first eccentrics 8, the center 35 of which is moved as indicated by arrow 41 about the vertical axis of shaft 9. If reaction (R and r) is persisting, the position of the geometrical pivot axis of levers 7 is modified relatively to hinge point 10 and to rotating shaft 14. As soon as the reaction (R and r) comes back to its normal value R, the return system 15 automatically brings back arm 16, first eccentric 8, and center 35 to their original position.

Figure 13:
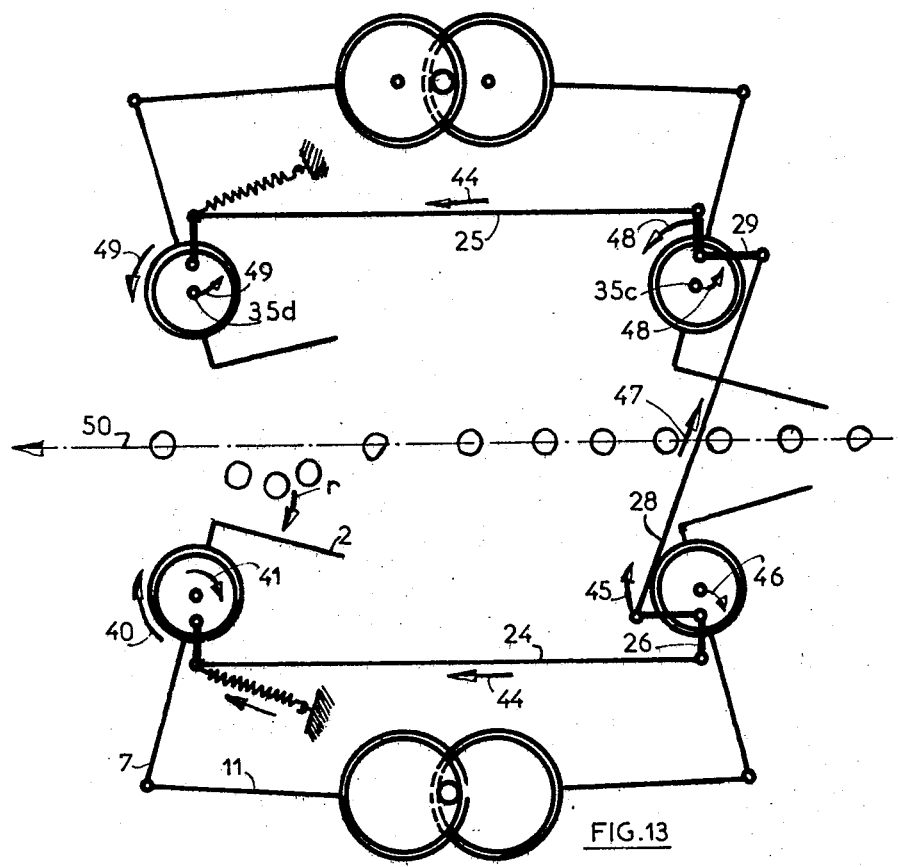
FIG. 13 is a diagrammatical view corresponding to FIG. 1, illustrating the forces and movements in the beater self-adjusting operation.

FIG. 13 illustrates diagrammatically the general distribution of forces on the self-adjusting operation of the whole beating mechanism when only one of the beaters (for example beater 2) receives an increase r in the vine stocks reaction. Said additional reaction r causes an additional elongation of resilient return system 15 (arrow 43). Arm 16 and first eccentric 8 are pivoted in the direction of arrows 40 and 41. This results in the following motions:

connecting bar 24 moves in the direction of arrow 44;
cranked arm 26 is pivoted in the direction of arrow 45;
the corresponding first eccentric is rotated in the direction of arrow 46;
transverse bar 28 is moved in the direction of arrow 47;
cranked arm 29 is rotated in the direction of arrow 48 together with the center 35c of the corresponding first eccentric;
connecting bar 25 is moved in the direction of arrow 44;
finally, the center 35d of the first eccentric on beater 3 is shifted in the direction of arrow 49.

Figure 14:
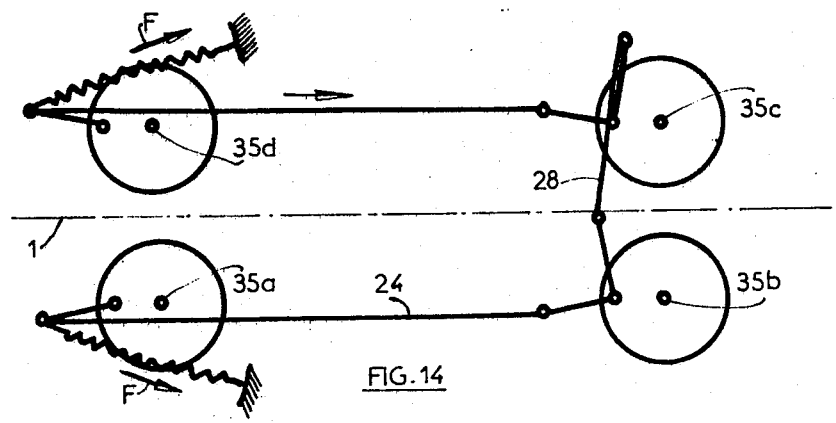
FIG. 14 illustrates the position of the return- and connecting-systems when the spacing between both opposite beaters is maximal.

The final position of the pivot axes 35a, 35b, 35c, and 35d of the four beaters 2, 3, 4, and 5 (FIGS. 13 and 14) is illustrated on FIG. 14. It appears that the centers 35 have been moved angularly of 90° about vertical axis of their first eccentrics (such as 9). Moreover, the vertical plane 1 of the vine row remains a symmetry plane for the opposite eccentrics. Finally, as soon as the additional reaction r is suppressed, resilient return systems 15 bring back automatically said first eccentrics to their original position. It will be understood that with this disposition, the operator can modify the beater whips spacing 42 or 37 (FIGS. 5 to 12) from his driving seat, during the machine operation.

Quite obviously, it would be possible to use various embodiments for the resilient return means 15, for the connecting elements between the first eccentrics of the beaters, or for the phase shift of the beaters. This would be possible without leaving the scope of the invention.

For example, it would be possible to suppress the transverse bar 28. In this case, the two couple of beaters 2, 3, 4, and 5 still would be self-adjusting under action of their respective resilient return means 15, but both beating planes 2, 4 and 3, 5 would be independent from each other.

In another possible embodiment, a mechanism including a chain 51 and a chain wheel 52 integral with shaft 14 (FIG. 17) could be used for connecting the rotation of both shafts 14 and 19.

Figures 15, 16, 17:
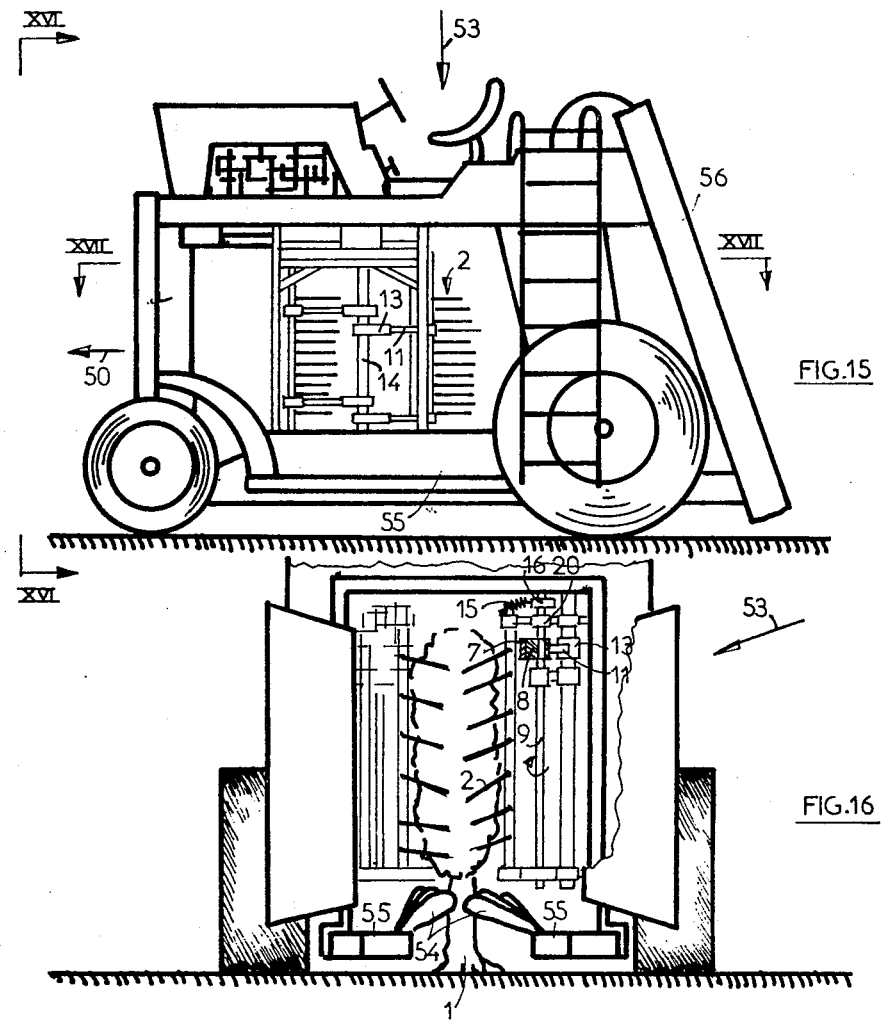
FIG. 15 illustrates the self-adjusting beaters mounted on various grape-harvesting machines.
FIG. 16 is a view seen from line XIV—XIV of FIG. 15.
FIG. 17 shows a mechanism for rotating the second eccentrics.

FIGS. 15 and show how the self-adjusting beating mechanism of the invention can be adapted on a grape-harvesting machine 43 of known type. Said machine 52 is collecting grapes on only one vine row 1. The grape clusters are falling down onto movable plates 54, then evacuated by side transporters 55 on each side of the vine row and finally by a general rear transporter 56.

FIG. 18 illustrates a general frame 57 having two harvesting tunnels 58 disposed side by side. This machine is towed by a tractor 59 driven between the two vine rows concerned (arrow 60). In each tunnel 58, grape clusters are collected by means of a self-adjusting beating mechanism according to the invention. The frame 57 is carrying at least two beating groups, i.e., at least eight beaters. The spacing between both beating groups can be adjusted in the known manner by transverse carriages 61 and 62.

The main advantages of the invention are as follows:

It is possible to reduce the spacing between the beating planes, as well at the front portion as at the rear portion of the machine. It is also possible to give the beating whips, an orientation substantially parallel to the vine row. Therefore, each whip is beating along a bigger length, so that the most ripe grapes are detached from the vine stock prior to being shuttled by the whip ends. This results in a reduction of the shocks, and the grape berries are collected without being damaged.

When the dimensions of the vine stocks is varying along a vine row (some vine stocks are thicker than others), the grapes are automatically detached in the best manner at any moment, namely:

if the vine stocks are thin, the spacing between the beating planes is automatically decreased by the resilient return means, while the beating frequency remains constant and the oscillation amplitude is mimimal;

if the vine stocks are thicker, the foliage reaction on the beater rotates the eccentrics, while the spacing between the beating planes is increasing; therefore, the distance between the free ends of the whips is increased, but this greater opening is compensated by an increase of the transverse oscillation frequency. It should be understood by those skilled in the art of grape harvesting that other forms of the present invention can be had, all coming within the spirit of the invention and the scope of the appended claims.

What is claimed is as follows:

1. A beating device for a grape harvesting machine for the harvesting of grapes from a row of grapevines, said beating device comprising:
   a frame;
   a pair of beaters mounted on said frame in opposing relationship to define thereinbetween a longitudinal space for the passage of said row of grapevines, each of said beaters comprising:
   a plurality of vertically spaced, horizontally disposed whips;
   a pivotally mounted lever, said whips being carried at one end of said lever;
   a first eccentric, said eccentric being carried by said lever at a point inwardly spaced from said whips, said lever being pivotable about the center of said first eccentric;
   a first vertical shaft rotatably carried by said frame, said eccentric being integral with said shaft and rotatable therewith in an eccentric relationship;
   an arm member carried by said first eccentric;
   an adjustable, resilient return means having one end fixed to said frame, while the other end thereof is carried by said arm member in such a manner that said resilient return means functions to automatically return said whip toward said longitudinal space, the amount of the resilient force increasing in response to the resistance to said whip returning to said space such that said first eccentric is rotated about its vertical axis;
   a second shaft carried by said frame for rotation about a second vertical axis;
   a second eccentric driven by said second shaft;
   a connecting rod having one end connected to said second eccentric and the other end connected to an end of said lever opposite said whip-carrying end of said lever; and
   means for rotating said second shaft about said vertical axis.

2. The beating device defined in claim 1 further comprising a connecting bar connecting the arm member carried by the first eccentric of said pair of beaters such that said connecting bar coordinates the effect of the oscillation of said opposing beaters.

3. The beating device defined in claim 1 further comprising a whip-carrying plate for each beater which is connected to the eccentric connecting rod by means of two similar transverse levers, each of which is carried by said first eccentric, the angular movements of which move on the geometric axis about which said transverse levers are oscillated by means of said connecting rod which is connected to said other end of said levers.

4. The beating device defined in claim 1 further comprising:
   a second pair of beaters mounted on said frame in opposing relationship to define thereinbetween a longitudinal space for the passage of said row of grapevines, said longitudinal space of said pair of beaters and said second pair of beaters being contiguous;
   one of said second pair of beaters being adjacent and communicating with one of said pair of beaters on one side of said longitudinal space, while the other of said second pair of beaters being adjacent and communicating with the other of said pair of beaters on the other side of said longitudinal space, said second pair of beaters each being constructed analogous to each of said pair of beaters;
   a transverse connecting bar connected at one end to said first vertical shaft of one of said second pair of beaters, said bar further connected at the other end to said first vertical shaft of the other of said second pair of beaters;
   means for connecting said transverse connecting bar to said first vertical shaft of each of said second pair of beaters, said connecting means being inversely orientated so that the vertical plane of the vine row is at any moment a symmetry plane for the said first eccentrics of said second pair of opposing beaters;
   and means for driving said first vertical shaft of each of both pairs of beaters, said driving means mounted to said frame.

5. The beating device according to claim 4 further comprising a longitudinal connecting bar mounted at one end to said first vertical shaft of one of said pair of beaters and at the opposite end to said first vertical shaft of one of said second pair of beaters; and means for mounting said connecting bar to said first vertical shaft of one of each of said pair of beaters, so that the transverse oscillations of two beaters located on the same side of the vine row are synchronized.

6. The beating device defined in claim 5 wherein on each side of said longitudinal space defined by said opposing relationship of said pair of beaters and said second pair of beaters, only one first vertical shaft is provided with said resilient return means, while said first vertical shaft of said adjacent beater is connected to said transverse connecting bar whereby said resilient return means of said only one first vertical shaft functions to automatically return said plurality of horizontally spaced whip of said adjacent beaters on each side of said longitudinal space.

7. The beating device defined in claim 1 wherein each resilient return has one end fixed to said frame and its other end fixed to an arm integral with said first vertical shaft of a beater so that, for a constant longitudinal stroke of said connecting rods, the spacing between said two opposite beaters is increasing together with the transverse oscillation amplitude of said beaters, said amplitude being modified by rotation of said first vertical shafts.

8. The beating device according to claim 4 further comprising: a first cranked arm mounted to and having an apex which is integral with said first vertical shaft of one of said pair of beaters; and
   a second cranked arm mounted to and having an apex which is integral with said first vertical shaft of one of said second pair of beaters, said transverse connecting bar having one end hinged to said first cranked arm and its other end hinged to second cranked arm, both cranked arms being orientated in opposition to each other that, when one of said first vertical shafts is pivoted in one direction, the other one is pivoted in the opposite direction.

9. The beating device defined in claim 3 wherein the angular timing of said longitudinal connecting rods with respect to each other on the same second vertical shaft permits beaters, having an oscillation phase shift, to drive on the same side of the space, while the oscillation frequency is the same for all of the beaters.

* * * * *

UNITED STATES PATENT OFFICE
CERTIFICATE OF CORRECTION

Patent No. 4,085,572    Dated April 25, 1978

Inventor(s)    Alain Bruel

It is certified that error appears in the above-identified patent and that said Letters Patent are hereby corrected as shown below:

Column 2, line 23, delete "level" and insert ----lever----.

Column 3, line 3, delete "or" and insert ----of----.

Column 3, line 18, delete the numerals "XIV-XIV" and insert ----XVI-XVI----.

Column 6, line 24, delete the numeral "43" and insert ----53----.

Same line delete the numeral "52" and insert ----53----.

Signed and Sealed this

Seventeenth Day of October 1978

[SEAL]

Attest:

RUTH C. MASON
Attesting Officer

DONALD W. BANNER
Commissioner of Patents and Trademarks